United States Patent
Radhakrishnan et al.

(10) Patent No.: US 7,366,885 B1
(45) Date of Patent: Apr. 29, 2008

(54) METHOD FOR OPTIMIZING LOOP CONTROL OF MICROCODED INSTRUCTIONS

(75) Inventors: Arun Radhakrishnan, Austin, TX (US); Karthikeyan Muthusamy, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 299 days.

(21) Appl. No.: 10/858,791

(22) Filed: Jun. 2, 2004

(51) Int. Cl.
*G06F 9/00* (2006.01)
(52) U.S. Cl. ............................. 712/241; 711/125
(58) Field of Classification Search ........ 712/241; 711/125
See application file for complete search history.

(56) References Cited

U.S. PATENT DOCUMENTS

| | | | | |
|---|---|---|---|---|
| 5,579,493 A | * | 11/1996 | Kiuchi et al. | 712/207 |
| 5,692,146 A | * | 11/1997 | Yamamoto et al. | 711/200 |
| 5,752,015 A | * | 5/1998 | Henry et al. | 712/241 |
| 5,898,865 A | * | 4/1999 | Mahalingaiah | 712/239 |
| 6,003,128 A | * | 12/1999 | Tran | 712/241 |
| 6,032,252 A | * | 2/2000 | Petro et al. | 712/233 |
| 6,988,190 B1 | * | 1/2006 | Park | 714/241 |
| 7,039,793 B2 | * | 5/2006 | Col et al. | 712/241 |
| 2004/0044885 A1 | | 3/2004 | Zou et al. | |

OTHER PUBLICATIONS

"Evaluation of Design Options for the Trace Cache Fetch Mechanism"; Patel et al.; 1999; IEEE.*

* cited by examiner

*Primary Examiner*—Alford Kindred
*Assistant Examiner*—Benjamin P. Geib
(74) *Attorney, Agent, or Firm*—Meyertons Hood Kivlin Kowert & Goetzel, P.C.; Stephen J. Curran

(57) ABSTRACT

A method for optimizing loop control of microcoded instructions includes identifying an instruction as a repetitive microcode instruction such as a move string instruction, for example, having a repeat prefix. The repetitive microcode instruction may include a loop of microcode instructions forming a microcode sequence. The microcode sequence is stored within a storage of a microcode unit. The method also includes storing a loop count value associated with the repetitive microcode instruction to a sequence control unit of the microcode unit. The method further includes determining a number of iterations to issue the microcode sequence for execution by an instruction pipeline based upon the loop count value. In response to receiving the repetitive microcode instruction, the method includes continuously issuing the microcode sequence for the number of iterations.

11 Claims, 6 Drawing Sheets

METHOD FOR OPTIMIZING LOOP CONTROL OF MICROCODED INSTRUCTIONS

BACKGROUND OF THE INVENTION

1. Field of the Invention

This invention relates to microprocessors and, more particularly, to loop control optimization of microcoded instructions.

2. Description of the Related Art

Computer system processors that employ the x86 architecture include certain instructions within the x86 instruction set that are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation. Often, complex instructions are classified as MROM instructions. MROM instructions are transmitted to a microcode instruction unit, or MROM unit, within the microprocessor, which decodes the complex MROM instruction and dispatches two or more simpler fast-path instructions for execution by the microprocessor. The simpler fast-path instructions corresponding to the MROM instruction are typically stored in a read-only memory (ROM) within the microcode instruction unit. The microcode instruction unit determines an address within the ROM at which the simpler fast-path instructions are stored, and transfers the fast-path instructions out of the ROM beginning at that address. Multiple clock cycles may be used to transfer the entire set of fast-path instructions corresponding to the MROM instruction. The entire set of fast-path instructions that effect the function of an MROM instruction is called a microcode sequence. Each MROM instruction may correspond to a particular number of fast-path instructions dissimilar from the number of fast-path instructions corresponding to other MROM instructions. Additionally, the number of fast-path instructions corresponding to a particular MROM instruction may vary according to the addressing mode of the instruction, the operand values, and/or the options included with the instruction. The microcode unit issues the fast-path instructions into the instruction-processing pipeline of the microprocessor. The fast-path instructions are thereafter executed in a similar fashion to other instructions. It is noted that the fast-path instructions may be instructions defined within the instruction set, or may be custom instructions defined for the particular microprocessor.

Conversely, less complex instructions are decoded by hardware decode units within the microprocessor, without intervention by the microcode unit. The terms "directly-decoded instruction" and "fast-path instruction" will be used herein to refer to instructions which are decoded and executed by the microprocessor without the aid of a microcode unit. As opposed to MROM instructions which are reduced to simpler instructions which may be handled by the microprocessor, fast-path instructions are decoded and executed via hardware decode and functional units included within the microprocessor.

Fast-path instructions that implement an MROM instruction may include branch instructions. For example, a string instruction may include a loop of instructions. A microcode loop is one or more instructions that are repetitively executed a specific number of times. The specific number of iterations is called a loop count or string count. A microcode loop typically includes a branch instruction and a decrement instruction. With each iteration of the loop, the string count is decremented and a branch instruction tests the string count for a termination condition. If the termination condition is false, the branch instruction branches to the top of the loop and the instructions of the microcode loop are executed again. Termination conditions may include the string count being equal to zero and a flag being asserted or unasserted.

Computer system processors that employ the x86 architecture also include string instructions designed to allow data structures, such as alphanumeric character strings, for example, to be moved to and from memory. Examples of string instructions in the x86 architecture are MOVS (move string) and CMPS (compare string). The MOVS instruction loads data from a memory location specified by index register ESI, increments/decrements ESI, stores the loaded data to a memory location specified by EDI and increments/decrements EDI. When executed, the string instructions described above may perform a single iteration.

The string count or count value determines the number of iterations to perform the string instruction. If longer strings or groups of data must be transferred, a "repeat" string instruction may be used. In such instructions, the repeat prefix may create a repeating string instruction that iterates a number of times. The number of iterations may be controlled by a string count or count value. Typically, the ECX register (or the rCX register in 64-bit machines) stores the number of iterations to repeat the string instruction. Accordingly, each iteration of MOVS register ECX may be decremented and a termination condition is tested. A direction flag (DF) indicates whether the index registers (ESI and EDI) are incremented or decremented. By incrementing/decrementing the index registers, the string instruction operates on a series of sequential data. For example, MOVS can move a block of data from one memory location to another memory location. The size of the block is determined by the string count stored in register ECX.

The repeat string instructions are microcoded instructions. Thus, when a repeat sting instruction is executed, the microcode sequence controller may dispatch microinstructions that implement the functionality of the x86 REP instruction. This may be accomplished by using a loop of microcode instructions including a single microcode entry-point. The microcode sequencing hardware may place the MROM unit into a continuous unconditional loop such that the microcode sequence controller may continuously dispatch microcode instructions to the execution core until a termination condition indication is received from the execution core. One or more of the microcode instructions may test the termination condition of the loop. As described above, the termination condition may be based on the value of the ECX register and possibly the state of the zero flag, depending on the type of repeat prefix used. The ECX value may be decremented each iteration by one of the microcode instructions. However, by the time the termination indication is received, multiple excess microcode instructions may have been dispatched that will not be executed. The excess microcode instructions must be cancelled and flushed from the instruction pipeline; thereby causing a branch-misprediction penalty. If REP prefixes are used frequently, the branch-misprediction penalties may be significant.

SUMMARY OF THE INVENTION

Various embodiments of a method for optimizing loop control of microcoded instructions are disclosed. In one embodiment, the method includes identifying an instruction as a repetitive microcode instruction such as a move string instruction having a repeat prefix, for example. The repetitive microcode instruction may include a loop of microcode instructions forming a microcode sequence. Typically, the loop of microcode instructions and hence the microcode sequence is stored within a storage of a microcode unit. The method also includes storing a loop count value associated with the repetitive microcode instruction to a sequence control unit of the microcode unit. The method further includes determining a number of iterations to issue the microcode sequence for execution by an instruction pipeline based upon the loop count value. In response to receiving the repetitive microcode instructions, the method includes continuously issuing the microcode sequence for the number of iterations.

In one specific implementation, storing the loop count value may include executing a microcode instruction, as part of the repetitive microcode instruction, that transfers the loop count value from a processor general purpose register such as the ECX register, for example, to a loop count storage of the sequence control unit.

In another specific implementation, storing a loop count value may include control logic within the sequence control unit moving the loop count value from the processor general purpose register to the loop count storage in response to receiving the repetitive microcode instruction.

In still another specific implementation, the method includes storing an encoded value corresponding to the loop count value within an operation corresponding to the repetitive microcode instruction. The operation is included within a trace stored within a trace cache. In addition, the method may include predicting and updating the encoded value stored within the trace cache. Further, the method may include control logic within the sequence control unit receiving and storing the encoded value to the loop count storage in response to receiving the repetitive microcode instruction from the trace cache.

In another embodiment, a processor is contemplated which includes an instruction scan unit and a microcode instruction unit. The instruction scan unit may be configured to identify an instruction as a repetitive microcode instruction. The repetitive microcode instruction corresponds to a loop of microcode instructions forming a microcode sequence for execution by an instruction pipeline. The microcode instruction unit may include a microcode storage and a sequence control unit. The microcode storage may be configured to store the microcode sequence. The sequence control unit may be configured to store a loop count value associated with the repetitive microcode instruction in a loop count storage. The sequence control unit may also be configured to determine a number of iterations to issue the microcode sequence based upon the loop count value. The sequence control unit may be further configured to continuously issue the microcode sequence for the number of iterations in response to receiving the repetitive microcode instruction from the instruction scan unit.

Figure 1:
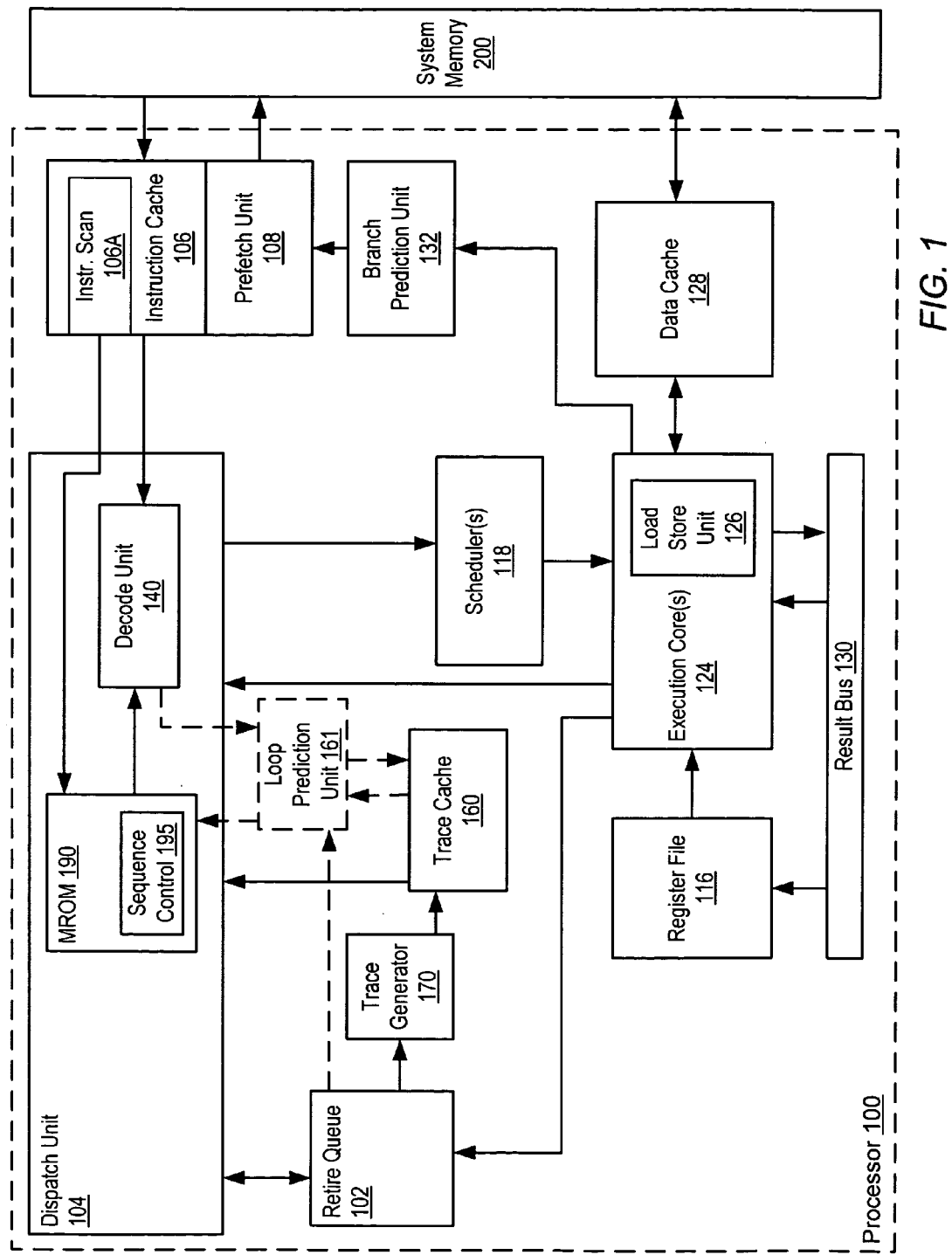
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a processor is shown. Processor 100 may be compatible with the x86 architecture. Processor 100 is configured to execute instructions stored in a system memory 200. Many of these instructions operate on data stored in system memory 200. System memory 200 may be physically distributed throughout a computer system and may be accessed by one or more processors 100.

In the illustrated embodiment, processor 100 includes an instruction cache 106 and a data cache 128. Processor 100 also includes a prefetch unit 108 coupled to system memory 200. Prefetch unit 108 may prefetch instruction code from system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache 106 and traces from trace cache 160 into a dispatch unit 104. Instructions may be fetched from instruction cache 106 in response to a given instruction address missing within trace cache 160. Likewise, instructions may be fetched from system memory 200 in response to a given address missing within instruction cache 106. In one embodiment, instruction cache 106 may include an instruction scan unit 106A that may be configured to scan instructions and to detect MROM instructions.

Dispatch unit 104 may be configured to receive instructions from instruction cache 106 and to receive decoded and/or partially decoded operations from trace cache 160. Dispatch unit 104 may include a decode unit 140 for decoding instructions received from instruction cache 106. Dispatch unit 104 may also include a microcode instruction unit (MROM) 195 for use when handling microcoded instructions. In the illustrated embodiment, MROM 195 is shown as being physically part of dispatch unit 104. However, dependent on the implementation, MROM 195 may be physically separate from dispatch unit 104. As will be described further below in conjunction with the description of FIG. 2 through FIG. 4, in one embodiment, MROM 195 may include logic configured to optimize loop control of certain MROM instructions.

The dispatch unit 104 is configured to dispatch operations to scheduler(s) 118. In one embodiment, one or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to a register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may decode certain instructions into one or more operations executable within execution core(s) 124. Simple instructions may correspond to a single operation while more complex instructions may correspond to multiple operations. Upon receiving an operation that involves the update of a register, the dispatch unit 104 may reserve a register location within register file 116 to store speculative register states. It is noted that in an alternative embodiment, a reorder buffer (not shown) may be used to store one or more speculative register states for each register.

When operations are handled by dispatch unit 104, if a required operand is a register location, register address information may be routed to a register map (not shown) or a reorder buffer (not shown). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register. It is noted that in the x86-64-bit architecture, additional registers may be included.

In one embodiment, processor 100 supports out of order execution. A retire queue 102 (or, alternatively, the reorder buffer) may keep track of the original program sequence for register read and write operations, allow for speculative instruction execution and branch misprediction recovery, and facilitate precise exceptions. In one embodiment, retire queue 102 may function similar to a reorder buffer, but may not provide any data value storage. In an alternative embodiment, retire queue 102 may provide data value storage for speculative register states and also support register renaming and thus may function more like a reorder buffer. In one embodiment, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Retire queue 102 may also provide signals identifying program traces to trace generator 170. Trace generator 170 may also be referred to as a fill unit. Trace generator 170 may store traces identified by retire queue 102 into trace cache 160. Each trace within trace cache 160 may include operations that are part of several different basic blocks. A basic block is a set of operations that begins just after a branch operation and ends with another branch operation, such that if any one of the operations in a basic block is executed, all of the operations in that basic block will be executed.

In one embodiment, loop prediction unit 161 may be configured to predict the loop count value based upon one or more historical attributes such as the ECX value used during previous repeat string instructions, for example. Further, as described in greater detail below, loop prediction unit 161 may update the loop count value stored within trace cache 160. The loop count value may be used by MROM unit 190 when dispatching microcode sequences during operation in a continuous loop mode and to update the loop count value associated with operations corresponding to certain MROM instructions that are stored in trace cache 160. It is noted that loop prediction unit 161 is an optional logic block and may be omitted in certain embodiments as indicated by the dashed lines.

In one embodiment trace cache 160 may include a plurality of locations for storing trace cache entries. The traces stored into trace cache 160 may include several decoded or partially decoded operations. As used herein, a "trace" is a group of operations that are stored within a single trace cache entry in the trace cache 160. As will be described in greater detail below in conjunction with the description of FIG. 3, in one embodiment, a trace cache entry may include a microcode accessible field for storing a loop count value (e.g., ECX value) used during repetitive MROM instructions such as the REP MOVS instruction described above, for example. In such embodiments, loop prediction unit 161 may update the loop count value.

Operations may be sent from the trace cache to the dispatch unit. When operations are fetched from the trace cache (as opposed to when instructions are loaded from instruction cache 106), the decode unit 140 may be at least partially bypassed, resulting in a decreased number of dispatch cycles for the cached operations. Accordingly, the trace cache 160 may allow the dispatch unit 104 to amortize the time taken to partially (or fully) decode the cached operations in decode unit 140 over several execution iterations if traces are executed more than once.

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In one embodiment, each scheduler 118 may not provide operand value storage. Instead, each scheduler may monitor issued operations and results available in register file 116 in order to determine when operand values will be available to be read by execution core(s) 124 (from register file 116 or result bus 130 or additional forwarding paths). In one embodiment, each scheduler 118 may be associated with a dedicated execution core 124. In another embodiment, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect.

In one embodiment, each of the execution core(s) 124 may include components configured to perform integer arithmetic operations of addition and subtraction, as well as shifts, rotates, logical operations, and branch operations. A floating-point unit may also be included to accommodate floating-point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. In such situations, the results of instructions in the original program sequence that occurred after the mispredicted branch instruction may be discarded, including those which were speculatively executed and temporarily stored in load/store unit 126 and/or register file 116.

Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information for pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

It is noted that processor 100 may also include and/or be coupled to other components in addition to those shown here. For example, additional levels of cache such as an L2 cache, for example, may be included (internal and/or external to processor 100) between processor 100 and system memory 200. Similarly, processor 100 may include a memory controller configured to control system memory 200 in some embodiments. Additionally, the interconnections between logical components may vary between embodiments.

Figure 2:
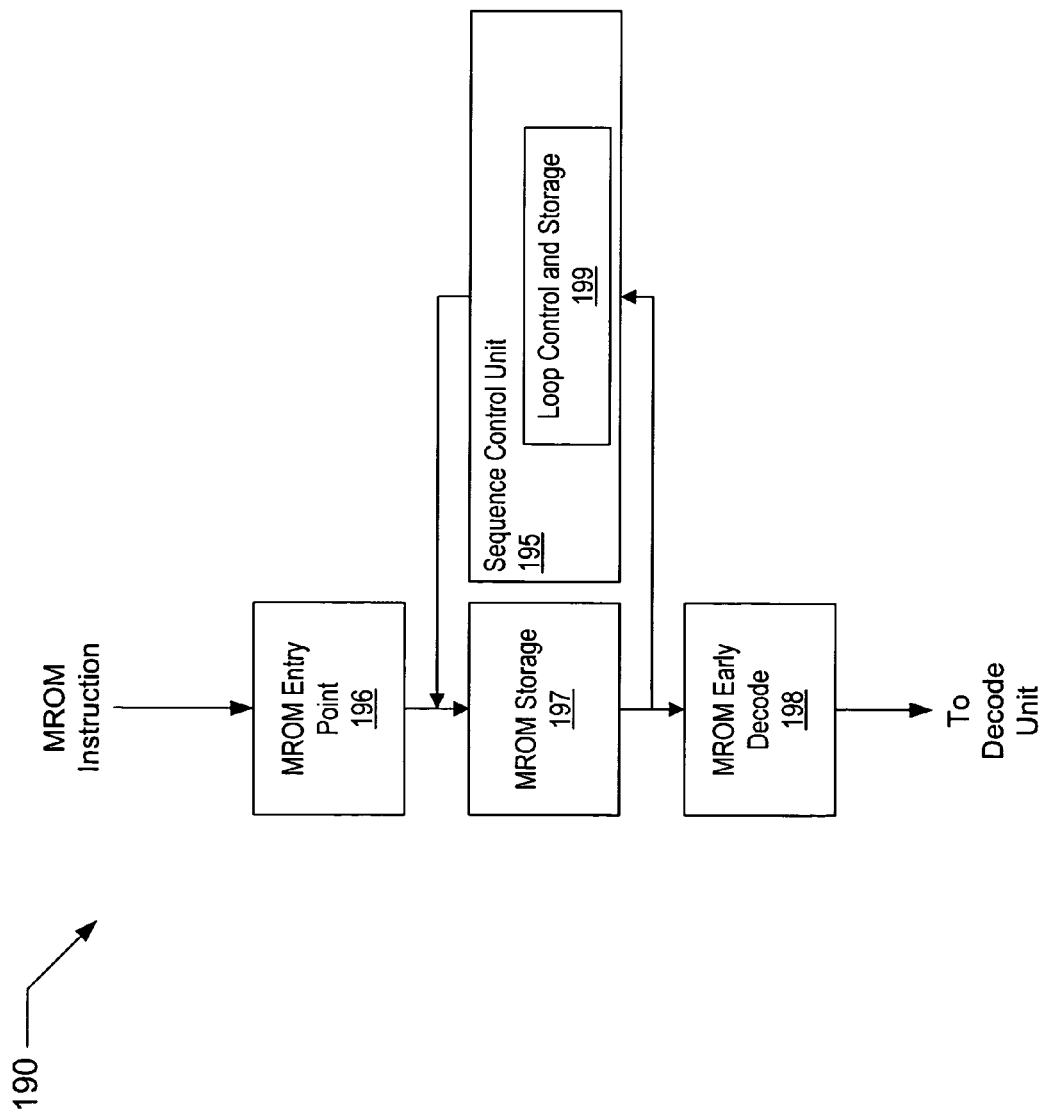
FIG. 2 is a block diagram of one embodiment of the MROM unit of the processor of FIG. 1.

Referring to FIG. 2, a block diagram of one embodiment of the MROM unit of the processor of FIG. 1 is shown. MROM unit 190 includes MROM entry point 196, MROM storage 197, sequence control unit 195, and MROM early decode 198.

When an MROM instruction is detected by the instruction scan unit 106A described above, the MROM instruction may be conveyed to MROM entry point 196. MROM entry point 196 may calculate the location, or microaddress, of the first fast-path instruction stored within MROM storage 197 that corresponds to the MROM instruction received from the instruction scan unit. In one embodiment, the microaddress may be calculated from the opcode, the ModR/M bytes, and the prefix byte of the microcode instruction. The microaddress calculated by MROM entry point 196 is the location of the first microcode line that stores the fast-path instructions that effectuate the desired operation of the MROM instruction. The number of fast-path instructions required to implement an MROM instruction varies from MROM instruction to MROM instruction. Complex MROM instructions may require many fast-path instructions, and relatively simple MROM instructions may be implemented by two fast-path instructions. The fast-path instructions that implement an MROM instruction may include branch instructions.

MROM storage 197 is a storage device capable of storing microcode instructions. In one embodiment, MROM storage 197 is a read-only memory (ROM). In other embodiments, other storage devices can be used to implement MROM storage 197. MROM storage 197 uses the entry point microaddress generated by MROM entry point 196 to access the first microcode instruction line of a microcode sequence. In one embodiment, MROM storage 197 stores multiple fast-path instructions in each microcode line of MROM storage 197. Because the number of fast-path instructions required to implement an MROM instruction may exceed the number of fast-path instructions in one line of MROM storage 197, sequence control 195 may determine the location of the next line of microcode to be accessed. The next line of microcode to be accessed may be the subsequent line in MROM storage 197. If, however, a microcode line in MROM storage 197 includes a "taken" branch instruction, sequence control unit 195 detects the branch microaddress and provides that microaddress as the next line to access from MROM storage 197. MROM storage 197 may contain two types of branch instructions: conditional sequence control branches and predict branches. A conditional sequence control branch is a branch instruction in which the branch condition can be resolved during decode. Predict branches are branches that cannot be resolved until the branch instruction is executed by a functional unit. Predict branches may depend on the state on the EFLAGs register. Because dispatched instructions that have not completed execution may modify the contents of this register, the branch condition cannot be resolved during decode. Therefore, a prediction is made whether the branch is "taken" or "not taken". This prediction is referred to as a "branch prediction indication." If the branch is predicted to be "taken", sequence control 195 generates the microaddress of the next microcode line to access. If the branch is predicted to be "not taken", sequence control 195 provides the microaddress of the next microcode line as the next microcode line to access.

In one embodiment, MROM unit 190 may use static branch prediction. In other words, the prediction is made during coding of the microcode and does not change. Other embodiments may use more complex branch prediction algorithms.

In one embodiment, in addition to specifying branch addresses, sequence control 195 also detects the last line of the microcode sequence. If a line of microcode in MROM storage 197 is the last line of microcode to implement an MROM instruction, sequence control 195 the next sequential instruction gets inserted to the scheduler either from dispatch unit or from the trace cache.

Each line of microcode accessed from MROM storage 197 may be dispatched to MROM early decode 198. MROM early decode 198 may format the instructions for later opcode decode by decode unit 140 of FIG. 1, for example.

As described above, 'REP MOVS' is an example of a string instruction. In one embodiment, an exemplary microcode instruction sequence to implement the MROM instruction REP MOVS is as follows:

```
           lddf                       ;load direction flag to latch in FU
           or          ecx, ecx       ;test if ECX is zero
           jz          end_loop       ;terminate string moves if ECX is zero
loop:      movfm+      tmp0, [esi]    ;move to tmp0 data from source and inc/dec esi
           movtm+      [edi], tmp0    ;move the data to destination and inc/dec edi
           cex/cexdec  loop           ;conditional exit and decrement until zero
end_loop:  exit
```

The 'lddf' instruction loads the direction flag. The direction flag indicates whether the index registers (esi and edi) are incremented or decremented between iterations. The microcode sequence tests the string count for zero by ORing the ECX register with itself and jumping on zero to the end of the loop. If the ECX register is non-zero, the loop of the string instruction is begun.

The loop portion of the REP MOVS instruction begins with the 'movfm' instruction and ends with the "exit" instruction. The loop is repeated a number of times specified by a value stored in the ECX register. For example, to move 16 units of data, the value stored into the ECX register may be 0Fh. In one embodiment, prior to executing the loop, the ECX value may be made available to sequence control 195. As described further below, the ECX value may be copied or placed into a loop control storage (not shown) within loop control unit 199, which may use the value in loop control register to determine how many iterations of the loop instructions to continuously dispatch. In one embodiment, during operation in an unconditional loop mode, the loop instructions are continuously dispatched for the number of iterations as determined by loop control 199 dependent on the value of ECX that was placed in the loop control storage. For example, in the unconditional loop mode, the 'movfm' instruction, the 'movtm' instruction and conditional-exit instruction may be continuously dispatched until the loop control unit determines, based on the value of the ECX register, that the appropriate number of iterations of the microcode sequence have been dispatched. In one embodiment, loop control unit 199 may use counter and compare logic which may decrement and compare the counter value to zero. In another embodiment, loop control unit 199 may use counter and compare logic which may increment and compare the ECX value to an iteration count value. Thus, if sequence control 195 ceases dispatching microcode sequences close to the correct number of iterations for a given transfer, a reduction in the penalties associated with canceling excess microcode sequence instructions may be realized.

The ECX value may be provided to sequence control 195 in a variety of ways. In one embodiment, the microcode sequence such as the sequence illustrated above, for example, may first move the value of the ECX register to the loop control storage (not shown) of sequence control 195 using a microcode accessible instruction.

In an alternative embodiment, loop control unit 199 may copy the ECX value into a loop control storage (not shown) in response to detecting any instruction involving the ECX register in conjunction with detecting an asserted repeat signal, for example. Loop control storage (not shown) may be any type of storage such as a register, for example. As described above, an instruction scan unit 106A may detect that an instruction is an MROM instruction, thus as part of the MROM instruction detection, the REP prefix may also be detected. When a REP prefix is detected, a 'repeat' signal may be provided by instruction scan unit 106A to MROM unit 190. In one embodiment, in response to receiving the asserted repeat signal, loop control unit 199 may copy the value of ECX into a loop control storage (not shown) and place MROM unit 190 in the unconditional loop mode.

It is noted that the value of ECX that is copied into the loop control storage of sequence control 195 is a speculative ECX value. Since the value of ECX used to determine the number of iterations is speculative, there exists a possibility that it may be incorrect. If any microcode instructions were dispatched to the instruction-processing pipeline subsequent to the conditional-exit instruction that caused the assertion of the termination signal, they are canceled.

As described above, sequence control 195 may also stop dispatching the loop instructions if a termination signal is received from either a functional unit of execution core 124 or the retire queue 102. Each time the conditional-exit instruction is executed by a functional unit of execution core 124, the count value in the ECX register is decremented. In one embodiment, the functional unit of execution core 124 outputs the termination signal to MROM unit 190 when the count value is zero. In an alternative embodiment, retire queue 102 outputs the termination signal when retire queue 102 retires the conditional-exit instruction that decrements the count value to zero.

In one embodiment, when a conditional-exit instruction detects a termination condition (either the count value going to zero or the ZF flag in the appropriate state), the functional unit asserts a status signal to retire queue 102. The status signal indicates to retire queue 102 that the result on the result bus is valid and a conditional-exit has occurred. When retire queue 102 retires the conditional exit instruction, retire queue 102 will detect the conditional-exit and assert a termination signal to MROM unit 190 to terminate the unconditional loop. In an alternative embodiment, the functional unit of the execution core 124 asserts a signal directly to MROM unit 190 to terminate the unconditional loop.

Because MROM unit 190 may have dispatched several iterations of the fast-path instructions that effectuate the function of the string instruction before the conditional-exit is retired in the reorder buffer or executed by the functional unit, the outstanding iterations are canceled. The cancellation may be accomplished in a similar manner to purging instructions subsequent to a mispredicted branch. The retire queue 102 purges the retire queue 102 entries, any instructions in the decode unit, reservation station, or load/store buffer. If the next instruction is microcoded, a new microcoded sequence may begin to be dispatched. If the next instruction is not microcoded, control will return to the decoder fast-path instruction pipeline or the next instruction may be inserted from the trace cache.

Figure 3:
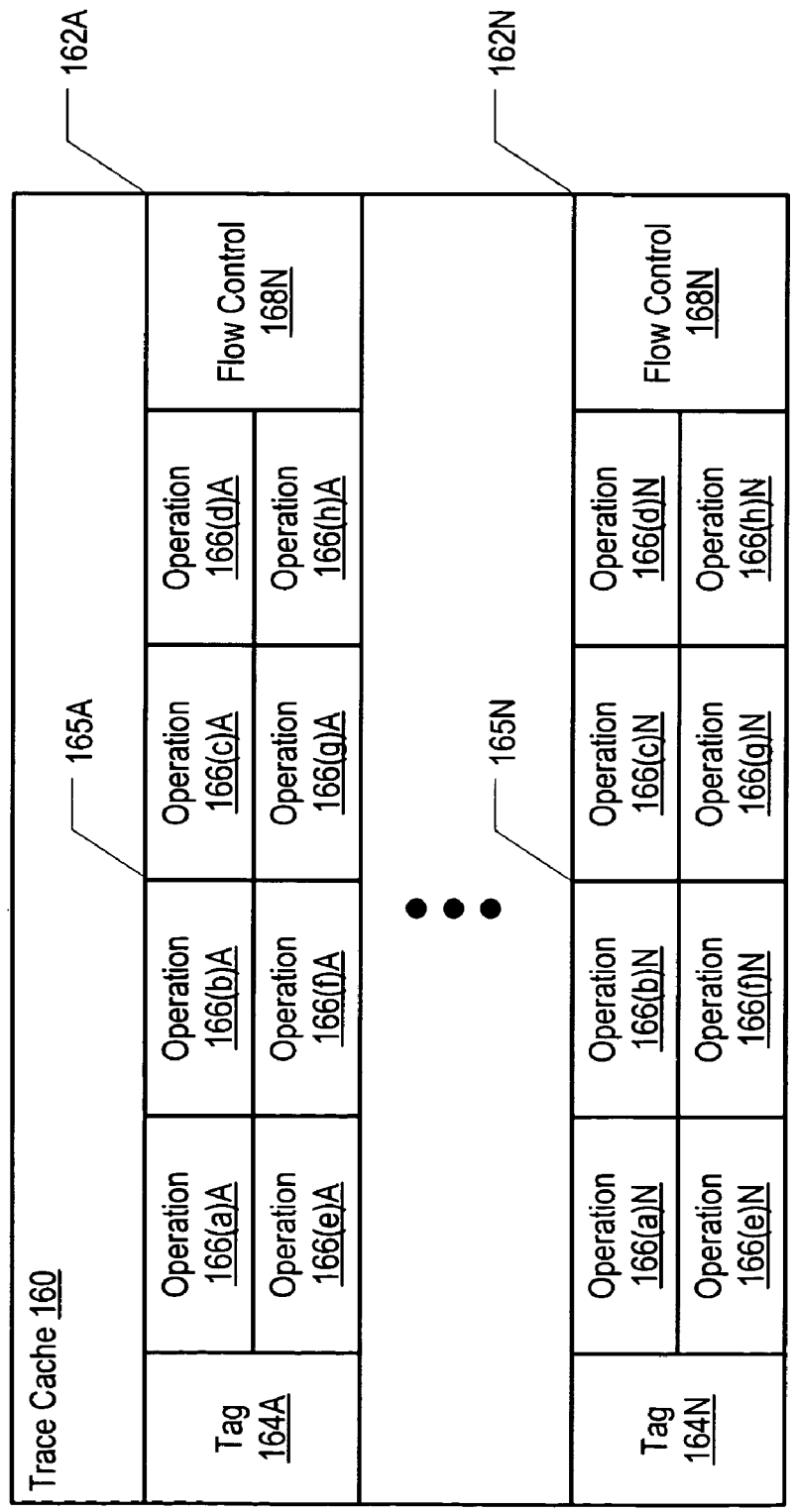
FIG. 3 is a diagram illustrating one embodiment of the trace cache of FIG. 1.

Turning to FIG. 3, one embodiment of an exemplary trace cache of FIG. 1 is shown. Trace cache 160 of FIG. 3 includes several entries designated 162A through 162N, where N may be any number. As described further below, each trace cache entry 162 may store a trace that includes one or more decoded instructions 165 or operations. Since there is no requirement that the decoded instructions be stored sequentially, the decoded instructions 165 in a trace may not be stored in program order. For example, a given entry 162 may store both a branch instruction and the instruction that is the destination of the branch when the branch is taken (as opposed to the instruction that follows the branch in program order). In some embodiments, the decoded instructions 165 in each trace cache entry 162 may be stored in at least partially decoded form. As used herein, the term "trace" refers to a group of operations decoded from one or more instructions stored in a single trace cache entry 162.

In the illustrated embodiment, a trace cache entry 162 may store up to eight component operations included in a group of decoded and/or partially decoded instructions in operation storage units 166(a)-166(h). Note that other embodiments may include fewer or additional operation storage units 166, allowing storage of different numbers of operations within each trace cache entry 162.

Certain operation storage units 166 within a trace cache entry 162 may be reserved for certain types of operations. For example, in one embodiment, a portion of the operation storage units (e.g., 166(a)-166(d)) may be used to store memory operations. Similarly, another portion of the operation storage units (e.g., 166(e)-166(h)) may be used to store data operations. It is noted that other embodiments may associate certain types of operations with certain operation storage units differently (or not at all). In one embodiment, an encoding of the loop count value (e.g., an encoding of the value of the ECX register) may be stored in a given operation storage unit 166(a)-166(d) along with the operation corresponding to a stored REP MOVS instruction. In one embodiment, the MROM unit 190 may access the ECX value stored within a given operation of trace cache 160. In another embodiment, the encoding of the loop count value may be stored in trace cache 160 along with the entry point to the microcode sequence stored within the MROM unit 190 that corresponds to the REP MOVS instruction.

In addition to including several operation storage units 166, each trace cache entry 162 also includes an identifying tag 164 and flow control information 168. Tag 164 may be similar to a tag in instruction cache 106, allowing prefetch unit 108 to determine whether a given operation hits or misses in trace cache 160. For example, tag 164 may include all or some of the address bits identifying the address of the earliest instruction within a given trace (e.g., the tag may include the address of the earliest instruction, in program order, stored within that trace). In another embodiment, the tag may include enough information that the address of each instruction (or at least the first instruction within each trace) may be independently identified using the information stored in the trace.

Referring collectively to FIG. 1 through FIG. 3, in one embodiment, loop prediction unit 161 of FIG. 1 may be configured to predict the loop count value associated with a given repeat string instruction and to store the loop count value within trace cache 161. Further, in another embodiment, loop prediction unit 161 may be configured to update the predicted loop count value using a corrective algorithm. The corrective algorithm may use such factors as the loop count value used in previous repetitive string instructions, for example. Thus, each time a repetitive string instruction is retired, loop prediction unit 161 may compare the previous predicted loop count value to the actual loop count value and may correct the predicted loop count value. This updated or corrected value may be written into the given trace cache entry that includes the loop count value if it is still being stored within trace cache 160, or loop prediction unit 161 may maintain the corrected value for use when the next repetitive string instruction is decoded.

Thus, when loop prediction unit 161 is used in conjunction with the loop control 199 of sequence control 195, MROM unit 190 may more accurately dispatch the correct number of microcode sequences to the execution pipeline and may possibly reduce the number of excess instructions that must be cancelled.

Figure 4:
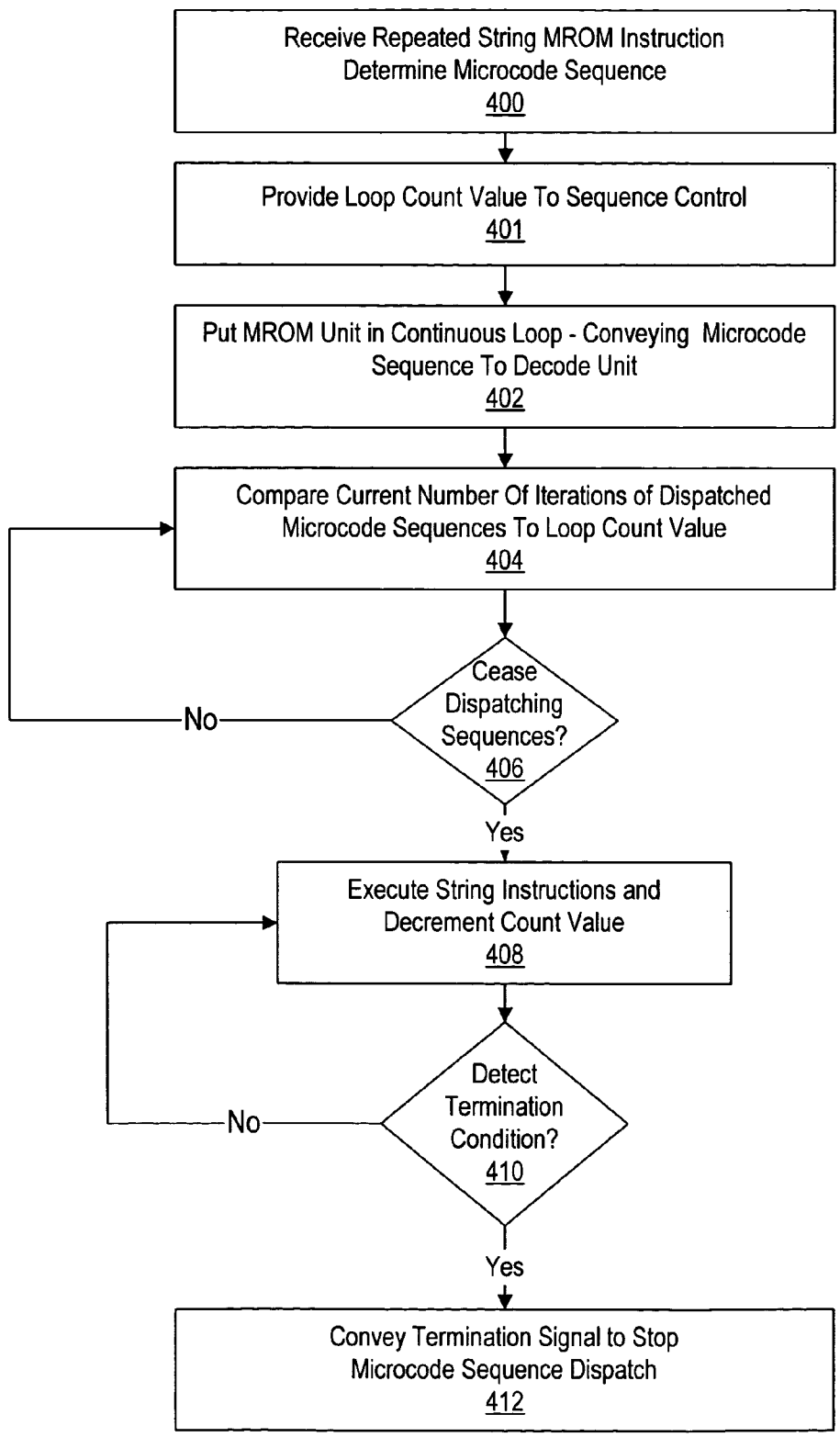
FIG. 4 is a flow diagram describing the operation of one embodiment of the MROM unit of FIG. 2.

Referring to FIG. 4, a flow diagram describing operation of the MROM unit of FIG. 1 and FIG. 2 is shown. Beginning in block 400, an MROM repeated move string instruction is received by MROM unit 190. Sequence control 195 generates the entry point and determines the microcode sequence for the MROM instruction. The loop count value is provided to loop control 199 of sequence control 195 via one of the embodiments described above (block 401). Sequence control 195 places MROM unit 190 in a continuous loop mode and MROM storage 197 is accessed. The microcode sequence of the loop portion of the MROM instruction is continuously dispatched to decode unit 140 (block 402). Each time the microcode sequence is dispatched, the loop count value is compared with the current number of iterations of dispatched microcode sequences (block 404). If the number of iterations indicated by the loop count value have been reached, loop control 199 may cease dispatching the microcode sequence to the decode unit 140 (block 406). The fast-path instructions of the microcode sequence are executed by execution unit 124 and a count value is decremented (block 408). The terminal condition of the loop is tested by the conditional exit instruction. If a terminal condition is not detected (block 410), execution of the microcode sequence continues. However, if a terminal condition is detected (block 410), a termination indication is provided to sequence control 195 (block 412). The termination signal causes the MROM unit 190 to stop dispatching the microcode sequence. In the event that the speculative value of ECX was too large, the excess instructions may be purged from the pipeline using a purge instruction. The purge instruction eliminates iterations of the microcode sequence dispatched subsequent to the iteration that generated the terminal condition. However, it is noted that if the speculative value of ECX was too small, the microcode sequence may continue to be dispatched one sequence at a time since the terminal condition had not been reached. In an alternative embodiment, sequence control 195 may return to a continuous loop mode.

It is noted that the operations described in blocks 408 through 412 may occur concurrently with the operations described in blocks 402 through 406. However, they are illustrated in FIG. 4 in a serial fashion for simplicity.

Exemplary Computer Systems

Figure 5:
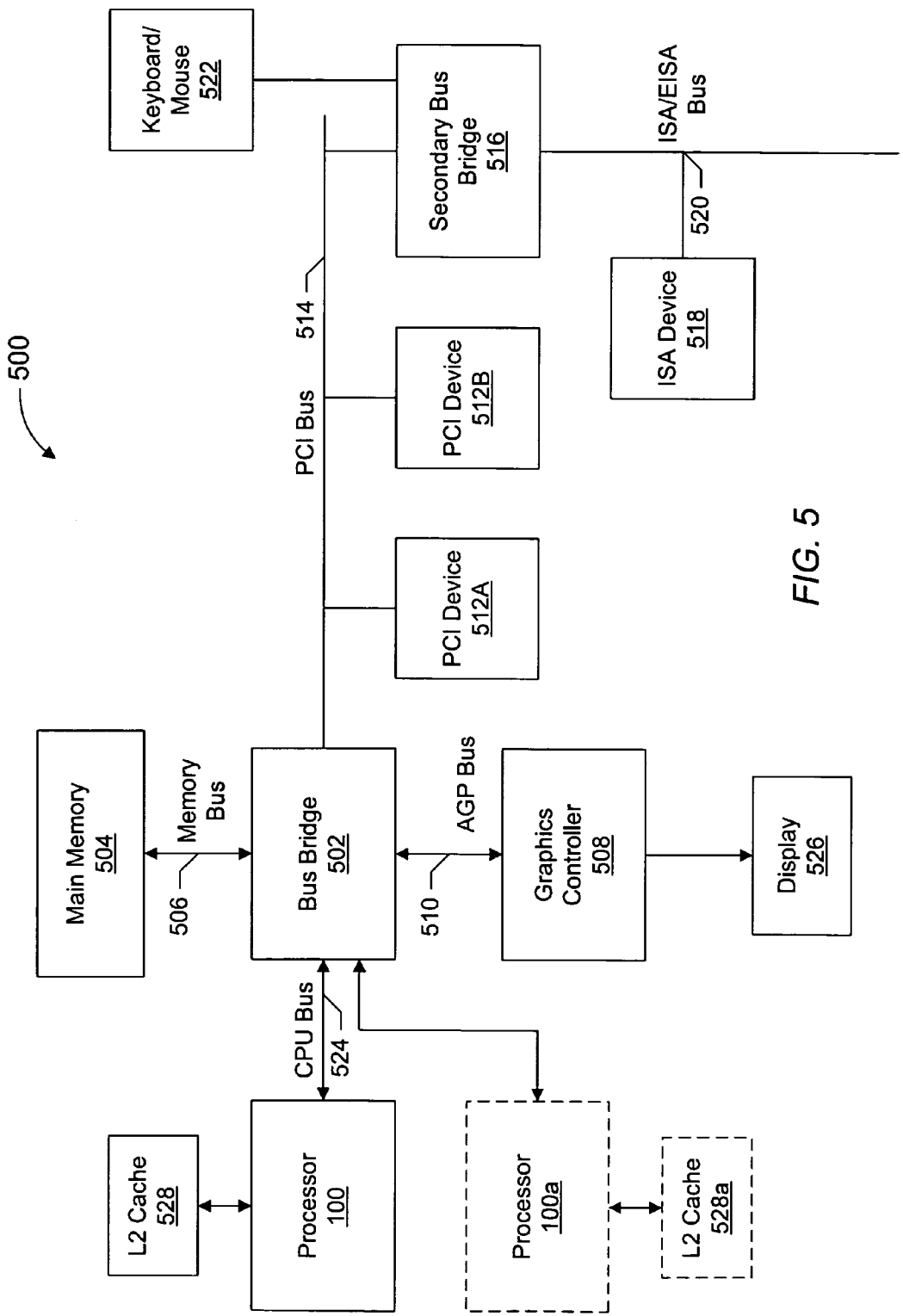
FIG. 5 is a block diagram of one embodiment of a computer system including the processor of FIG. 1.

Referring to FIG. 5, a block diagram of one embodiment of a computer system is shown. Components that correspond to those illustrated in FIG. 1 are numbered identically for clarity and simplicity. Computer system 500 includes a processor 100 coupled to a variety of system components through a bus bridge 502. Computer system 500 also includes a main memory 504 that is coupled to bus bridge 502 through a memory bus 506, and a graphics controller 508 is coupled to bus bridge 502 through an AGP bus 510. Several PCI devices 512A-512B are coupled to bus bridge 502 through a PCI bus 514. A secondary bus bridge 516 may also be provided to accommodate an electrical interface to one or more EISA or ISA devices 518 through an EISA/ISA bus 520. In this example, processor 100 is coupled to bus bridge 502 through a CPU bus 524 and to an optional L2 cache 528. It is noted that in other embodiments, processor 100 may include an integrated L2 cache (not shown).

Bus bridge 502 provides an interface between processor 100, main memory 504, graphics controller 508, and devices attached to PCI bus 514. When an operation is received from one of the devices connected to bus bridge 502, bus bridge 502 identifies the target of the operation (e.g., a particular device or, in the case of PCI bus 514, that the target is on PCI bus 514). Bus bridge 502 routes the operation to the targeted device. Bus bridge 502 generally translates an operation from the protocol used by the source device or bus to the protocol used by the target device or bus.

In addition to providing an interface to an ISA/EISA bus for PCI bus 514, secondary bus bridge 516 may incorporate additional functionality. An input/output controller (not shown), either external from or integrated with secondary bus bridge 516, may also be included within computer system 500 to provide operational support for a keyboard and mouse 522 and for various serial and parallel ports. An external cache unit (not shown) may also be coupled to CPU bus 524 between processor 100 and bus bridge 502 in other embodiments. Alternatively, the external cache may be coupled to bus bridge 502 and cache control logic for the external cache may be integrated into bus bridge 502. L2 cache 528 is shown in a backside configuration to processor 100. It is noted that L2 cache 528 may be separate from processor 100, integrated into a cartridge (e.g., slot 1 or slot A) with processor 100, or even integrated onto a semiconductor substrate with processor 100.

Main memory 504 is a memory in which application programs are stored and from which processor 100 primarily executes. A suitable main memory 504 may include various types of DRAM (Dynamic Random Access Memory). For example, a plurality of banks of SDRAM (Synchronous DRAM) or Rambus DRAM (RDRAM) may be used.

PCI devices 512A-512B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 518 is illustrative of various types of peripheral devices, such as a modem, a sound card, and a variety of data acquisition cards such as GPIB or field bus interface cards.

Graphics controller 508 is provided to control the rendering of text and images on a display 526. Graphics controller 508 may embody a typical graphics accelerator generally known in the art to render three-dimensional data structures that can be effectively shifted into and from main memory 504. Graphics controller 508 may therefore be a master of AGP bus 510 in that it can request and receive access to a target interface within bus bridge 502 to thereby obtain access to main memory 504. A dedicated graphics bus accommodates rapid retrieval of data from main memory 504. For certain operations, graphics controller 508 may further be configured to generate PCI protocol transactions on AGP bus 510. The AGP interface of bus bridge 502 may thus include functionality to support both AGP protocol transactions as well as PCI protocol target and initiator transactions. Display 526 is any electronic display upon which an image or text can be presented. A suitable display 526 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 500 may be a multiprocessing computer system including additional processors (e.g., processor 100*a* is shown as an optional component of computer system 500). Processor 100*a* may be similar to processor 100. More particularly, processor 100*a* may be an identical copy of processor 100 in one embodiment. Processor 100*a* may be connected to bus bridge 502 via an independent bus (as shown in FIG. 5) or may share CPU bus 524 with processor 100. Furthermore, processor 100*a* may be coupled to an optional L2 cache 528*a* similar to L2 cache 528.

Figure 6:
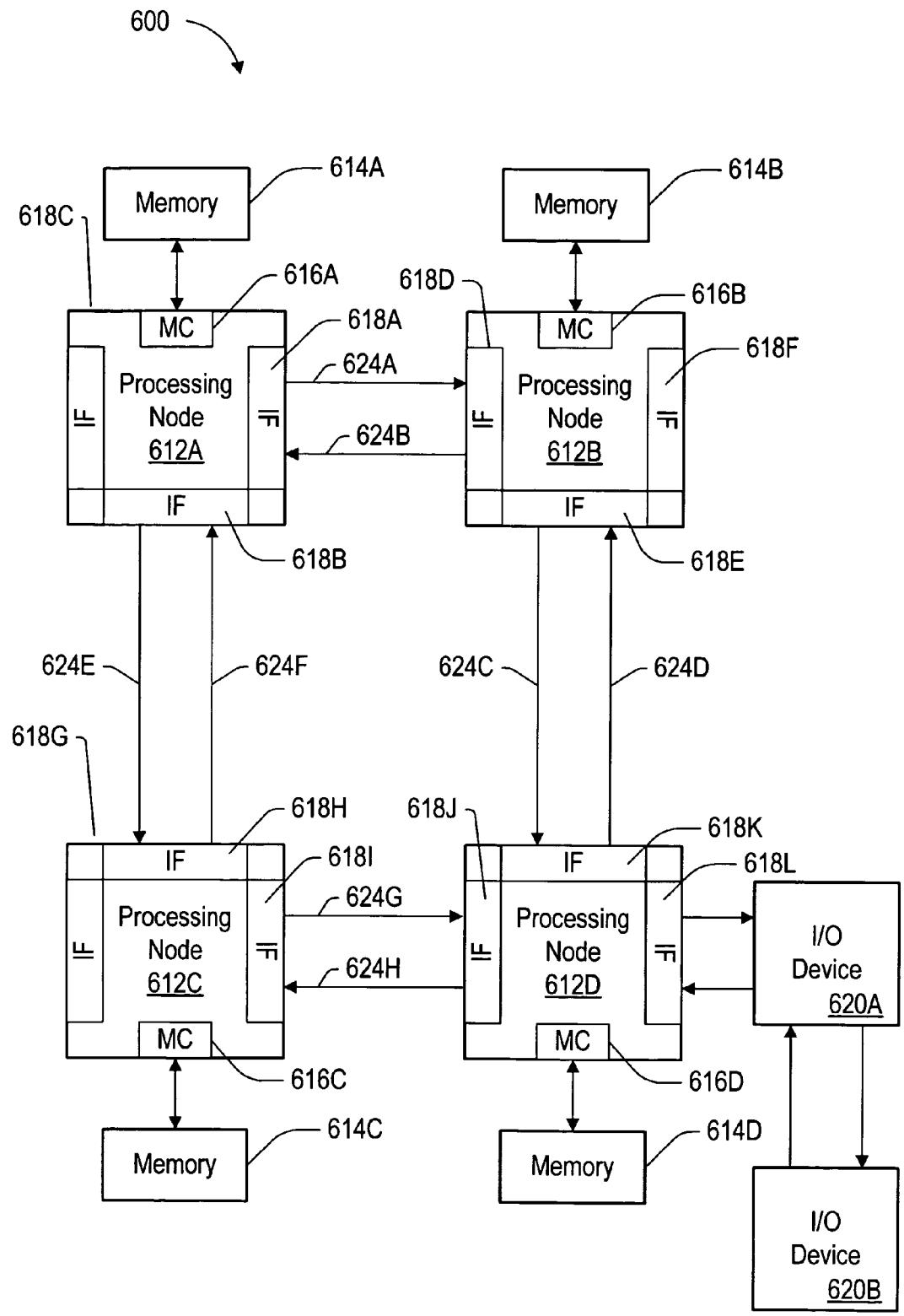
FIG. 6 is a block diagram of another embodiment of a computer system including the processor of FIG. 1.

Turning to FIG. 6, a block diagram of another embodiment of a computer system is shown. Components that correspond to those illustrated in FIG. 1 are numbered identically for clarity and simplicity. Computer system 600 includes several processing nodes 612A, 612B, 612C, and 612D. Each processing node is coupled to a respective memory 614A-614D via a memory controller 616A-616D included within each respective processing node 612A-612D. Additionally, processing nodes 612A-612D include interface logic (IF 618A-L) used to communicate between the processing nodes 612A-612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A-620B in a daisy chain configuration) via interface logic 618L. Other processing nodes may communicate with other I/O devices in a similar fashion.

In the illustrated embodiment, processing nodes 612A-612D implement a packet-based link for inter-processing node communication. The link is implemented as sets of unidirectional lines (e.g., lines 624A are used to transmit packets from processing node 612A to processing node 612B and lines 624B are used to transmit packets from processing node 612B to processing node 612A). Other sets of lines 624C-624H are used to transmit packets between other processing nodes as illustrated in FIG. 6. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C. Any suitable routing algorithm may be used. Other embodiments of computer system 600 may include more or fewer processing nodes then the embodiment shown in FIG. 6.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A-612D, in addition to a memory controller and interface logic, may include one or more processors. Broadly speaking, a processing node includes at least one processor and may optionally include a memory controller for communicating with a memory and other logic as desired. More particularly, each processing node 612A-612D may include one or more processors such as processor 100 of FIG. 1. As such, each processing node 612A-D may include an MROM unit 190 and/or the loop prediction unit 161 and associated logic as described above in conjunction with the descriptions of FIG. 1 through FIG. 4.

Memories 614A-614D may include any suitable memory devices. For example, a memory 614A-614D may include one or more types of DRAM such as RAMBUS DRAMs (RDRAMs), synchronous DRAMs (SDRAMs), double data rate SDRAM (DDR SDRAM), or static RAM, etc. The address space of computer system 600 may be divided among memories 614A-614D. Each processing node 612A-612D may include a memory map used to determine which addresses are mapped to which memories 614A-614D, and hence to which processing node 612A-612D a memory request for a particular address should be routed. In one embodiment, the coherency point for an address within computer system 600 is the memory controller 616A-616D coupled to the memory storing bytes corresponding to the address. In other words, the memory controller 616A-616D is responsible for ensuring that each memory access to the corresponding memory 614A-614D occurs in a cache coherent fashion. Memory controllers 616A-616D may include control circuitry for interfacing to memories 614A-614D. Additionally, memory controllers 616A-616D may include request queues for queuing memory requests.

Interface logic 618A-618L may include a variety of buffers for receiving packets from the link and for buffering packets to be transmitted upon the link. Computer system 600 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A-620B may be any suitable I/O devices. For example, I/O devices 620A-620B may include devices for communicate with another computer system to which the devices may be coupled (e.g., network interface cards or modems). Furthermore, I/O devices 620A-620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

It is noted that as used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

It is further noted that any of the instructions and registers used herein may have a corresponding 64-bit version; accordingly any reference to a non-64-bit instruction and/or register is intended to include a reference to the 64-bit instruction and/or register. For example, in the x86-64-bit architecture, the register equivalent to the 32-bit ECX register is the rCX register.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    identifying an instruction as a repetitive microcode instruction, wherein said repetitive microcode instruction includes a loop of microcode instructions forming a microcode sequence stored within a microcode unit;
    storing a loop count value associated with said repetitive microcode instruction to a sequence control unit of said microcode unit;
    determining a number of iterations to issue said microcode sequence for execution by an instruction pipeline based upon said loop count value;
    in response to receiving said repetitive microcode instruction, continuously issuing said microcode sequence for said number of iterations;
    storing an encoded value corresponding to said loop count value within an operation resulting from at least partial decoding of said repetitive microcode instruction, wherein said operation is included within a trace stored within a trace cache; and
    predicting said loop count value based upon a number of past iterations of the repetitive microcode instruction and updating said encoded value stored within said trace cache.

2. The method as recited in claim 1, wherein said repetitive microcode instruction includes a move string instruction preceded by a repeat prefix.

3. The method as recited in claim 1, wherein storing a loop count value includes executing a microcode instruction, as part of said repetitive microcode instruction, that transfers said loop count value from a processor general purpose register to a loop count storage of said sequence control unit.

4. The method as recited in claim 1, wherein storing a loop count value includes control logic moving said loop count value from a processor general purpose register to said loop count storage in response to receiving said repetitive microcode instruction.

5. The method as recited in claim 1, wherein storing a loop count value includes control logic receiving and storing said encoded value to said loop count storage in response to receiving said operation from said trace cache.

6. A processor comprising:
- an instruction scan unit configured to identify an instruction as a repetitive microcode instruction, wherein said repetitive microcode instruction corresponds to a loop of microcode instructions forming a microcode sequence for execution by an instruction pipeline;
- a microcode instruction unit coupled to said instruction scan unit, wherein said microcode instruction unit includes:
  - a microcode storage configured to store said microcode sequence; and
  - a sequence control unit coupled to said microcode storage and configured to store a loop count value associated with said repetitive microcode instruction in a loop count storage;
  - wherein said sequence control unit is further configured to determine a number of iterations to issue said microcode sequence based upon said loop count value; and
  - wherein said sequence control unit is further configured to continuously issue said microcode sequence for said number of iterations in response to receiving said repetitive microcode instruction from said instruction scan unit;
- a trace cache including a plurality of entries, each configured to store a trace including an operation resulting from at least partial decoding of said repetitive microcode instruction, wherein said operation includes an encoded value corresponding to said loop count value; and
- a loop prediction unit configured to predict said loop count value based upon a number of past iterations of the repetitive microcode instruction and to update said encoded value stored within said trace cache.

7. The processor as recited in claim 6, wherein said repetitive microcode instruction includes a move string instruction preceded by a repeat prefix.

8. The processor as recited in claim 6, wherein said repetitive microcode instruction further includes a microcode instruction configured to transfer said loop count value from a processor general purpose register to a loop count storage of said sequence control unit.

9. The processor as recited in claim 6, wherein said microcode instruction unit further includes a control unit configured to move said loop count value from a processor general purpose register to said loop count storage.

10. The processor as recited in claim 6, wherein said sequence control unit is further configured to store said encoded value in said loop count storage in response to receiving said operation from said trace cache.

11. A computer system comprising:
- a processor configured to execute instructions in an instruction pipeline; and
- a system memory coupled to said processor and configured to store said instructions;
- wherein said processor includes:
  - an instruction scan unit configured to identify a given instruction as a repetitive microcode instruction, wherein said repetitive microcode instruction corresponds to a loop of microcode instructions forming a microcode sequence for execution by said instruction pipeline;
  - a microcode instruction unit coupled to said instruction scan unit, wherein said microcode instruction unit includes:
    - a microcode storage configured to store said microcode sequence;
    - a sequence control unit coupled to said microcode storage and configured to store a loop count value associated with said repetitive microcode instruction in a loop count storage;
    - wherein said sequence control unit is further configured to determine a number of iterations to issue said microcode sequence based upon said loop count value;
    - wherein said sequence control unit is further configured to continuously issue said microcode sequence for said number of iterations in response to receiving said repetitive microcode instruction from said instruction scan unit;
  - a trace cache including a plurality of entries, each configured to store a trace including an operation resulting from at least partial decoding of said repetitive microcode instruction, wherein said operation includes an encoded value corresponding to said loop count value; and
  - a loop prediction unit configured to predict said loop count value based upon a number of past iterations of the repetitive microcode instruction and to update said encoded value stored within said trace cache.

* * * * *